July 17, 1962  J. J. KERLEY, JR  3,044,759
CABLE TYPE VIBRATION ISOLATOR WITH CAPTIVATING ELEMENTS
Filed Nov. 27, 1959
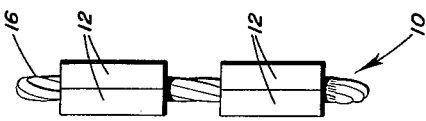
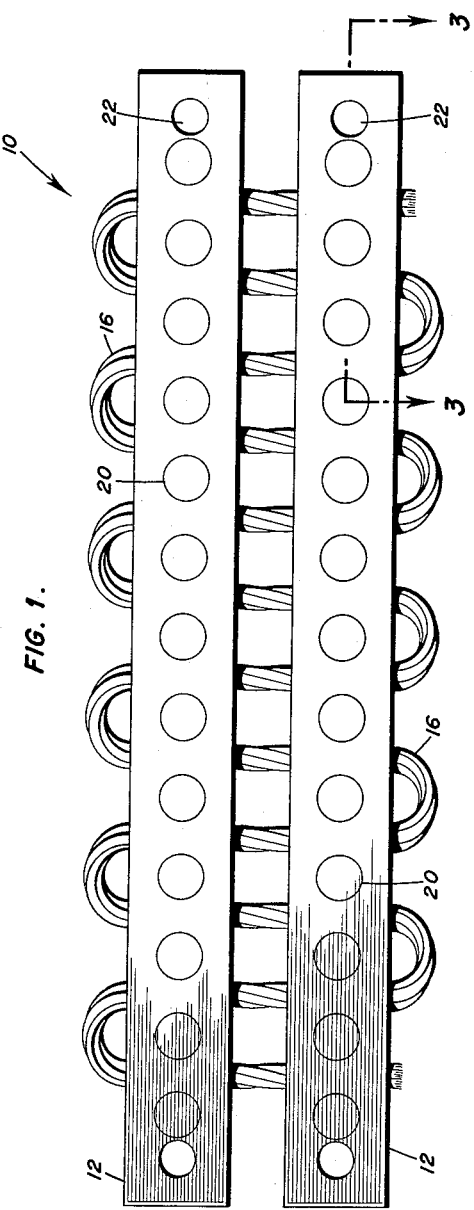
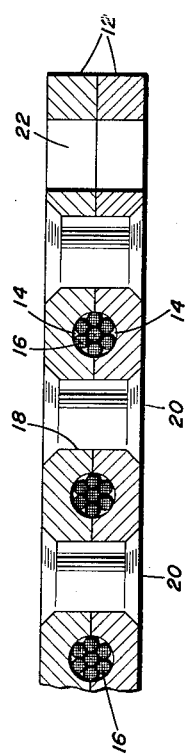
JAMES J. KERLEY, JR.
INVENTOR.
BY *Walter G. Finch*
ATTORNEY

United States Patent Office 3,044,759
Patented July 17, 1962

3,044,759
CABLE TYPE VIBRATION ISOLATOR WITH CAPTIVATING ELEMENTS

James J. Kerley, Jr., Cheverly, Md., assignor to Kerley Engineering, Inc., Cheverly, Md., a corporation of Maryland
Filed Nov. 27, 1959, Ser. No. 855,818
2 Claims. (Cl. 267—1)

This invention relates generally to shock and vibration type supports, and more particularly it pertains to cable type shock and vibration isolators.

Multi-strand cable used for isolation of objects from shock and vibration forces has great tensile strength and thus can support heavy weight for its size. To complement this strength of the multi-strand cable, it is important that the terminating loops of the cable be adequately secured in their mountings. A cylinder such as a rivet has great strength in shear. Furthermore, a counter sunk rivet arranged flush in its mounting makes a neat, compact, and strong, yet simple assembly.

It is, therefore, an object of this invention to provide a cable type isolator in which each of the loops or passes of the cable are centrally captivated by an assembly element of the isolator mount.

Another object of this invention is to provide a grooved, two-piece cable spacing mount in which assembly elements captivate each side of each pass of the cable.

Still other objects and advantages of this invention are to provide an improved cable type vibration isolator which is economical to manufacture and which is efficient and reliable in operational use in isolating objects from external shock and vibration forces.

These and other objects and attendant advantages of this invention will become more readily apparent and understood from the accompanying specification and drawings in which:

FIG. 1 is a side elevation of a novel cable type vibration isolator incorporating features of this invention;

FIG. 2 is a side view of the cable type shock and vibration isolator of FIG. 1; and FIG. 3 is a cross section of the isolator taken along line 3—3 of FIG. 1.

Referring now to the details of the drawings, in FIG. 1 there is shown a cable type shock and vibration isolator 10 incorporating features of this invention. This isolator 10 consists of a plurality of passes of resilient multistrand cable 16 interlaced between two pairs of spaced metallic strips or plates 12. If desired, the cable 16 can be of the solid type.

Each strip 12 of each pair of strips is milled with a plurality of equally spaced transverse semicircular grooves 14 as shown in FIG. 3. A plurality of equally spaced countersunk rivet holes 18 are drilled through each pair of strips 12 on opposite sides of semicircular grooves 14. The ends of the strips 12 are provided with mounting holes 22.

All the like grooves 14, rivet holes 18, and mounting holes 22 are accurately located in each strip 12 so as to mate with their counterparts in the adjacent strip 12. The strips 12 are then grouped back-to-back in two spaced pairs as shown in FIG. 2. The resilient multi-strand cable 16 is then reeved back and forth in a series of passes through the apertures between each pair of strips 12 formed by the mated semi-circular grooves 14 as shown in FIGS. 1 and 3. Flush rivets 20 are then driven in the holes 18 and set to draw and secure each pair of strips 12 together.

With rivets 20 alternately spaced between the grooves 14, a very strong and compact cable type of shock and vibration isolator 10 is obtained. Each loop of the cable 16 thus effectively passes around a rivet 20 and is held tightly within the mated grooves 14 of each pair of strips 12 by an adjacent rivet 20.

If desired, the grooves 14 may be made oversize compared to the diameter of the cable 16 to provide for self-equalizing of the cable passes without sacrificing the captivating action of the rivets 20, one for each loop of cable 16.

Obviously, many other modifications and variations of the present invention are possible in light of the above teachings. It is, therefore, to be understood that within the scope of the appended claims the invention may be practiced otherwise than as specifically described.

What is claimed is:

1. A cable type mount for supporting an object under isolation from shock and vibration forces comprising first and second pairs of metallic strips, the strips each having two parallel faces, and one such face in abutment with one such face of another strip, said first pair being parallel to and laterally spaced from the second pair, the strips of each pair having a plurality of parallel spaced lateral grooves extending across their abutting faces in registration to form bores, each bore in the first pair being aligned with a bore in the second pair, means for supporting the first pair of strips from the second pair of strips consisting of resilient multistrand cable reeved through the aligned bores back and forth between the pairs, the cable portions between the pairs of strips each being free of interconnecting material, and cable portions remote of both pairs connecting cable portions in adjacent bores in either pair in a curved cable loop, and countersunk cylindrical connecting elements connecting the strips of each pair together between each pair of adjacent bores whereby the cable portion in each bore is engaged by both strips with each cable loop and its connected cable portions positioned about a cylindrical element and the non-abutting parallel faces of the strips of each pair constitute mounting surfaces free of projections.

2. The structure of claim 1 further comprising means for mounting an object on the first pair of strips for resilient support from the second pair of strips.

References Cited in the file of this patent

UNITED STATES PATENTS

| | | |
|---|---|---|
| Re. 11,206 | Wells | Dec. 1, 1891 |
| 798,762 | Click | Sept. 5, 1905 |
| 1,010,717 | Augustine | Dec. 5, 1911 |
| 2,873,109 | Hartenstein et al. | Feb. 10, 1959 |

FOREIGN PATENTS

| | | |
|---|---|---|
| 252,086 | Great Britain | May 20, 1926 |